US009357026B2

(12) United States Patent
Baldwin et al.

(10) Patent No.: US 9,357,026 B2
(45) Date of Patent: May 31, 2016

(54) PRESENTITY AUTHORIZATION OF BUDDY SUBSCRIPTION IN A COMMUNICATION SYSTEM

(75) Inventors: John Baldwin, Coventry (GB); Christer Boberg, Tungelsta (SE); Hubert Przybysz, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 856 days.

(21) Appl. No.: 13/581,490

(22) PCT Filed: Mar. 3, 2010

(86) PCT No.: PCT/IB2010/000432
§ 371 (c)(1),
(2), (4) Date: Sep. 24, 2012

(87) PCT Pub. No.: WO2011/107814
PCT Pub. Date: Sep. 9, 2011

(65) Prior Publication Data
US 2013/0024949 A1    Jan. 24, 2013

(51) Int. Cl.
*H04L 29/06* (2006.01)
*H04L 29/08* (2006.01)
*H04L 12/58* (2006.01)

(52) U.S. Cl.
CPC ............... *H04L 67/24* (2013.01); *H04L 63/10* (2013.01); *H04L 12/5815* (2013.01); *H04L 51/043* (2013.01)

(58) Field of Classification Search
USPC ......................................................... 726/28
See application file for complete search history.

(56) References Cited

U.S. PATENT DOCUMENTS

| 2004/0117228 A1 | 6/2004 | Iino et al. |
| 2007/0078965 A1 | 4/2007 | Shimamura et al. |
| 2009/0186638 A1* | 7/2009 | Yim et al. ............. 455/466 |
| 2010/0045426 A1 | 2/2010 | Kakuta et al. |
| 2010/0107088 A1* | 4/2010 | Hunt et al. ............. 715/752 |

FOREIGN PATENT DOCUMENTS

| CN | 1863172 A | 11/2006 |
| CN | 101141268 A | 3/2008 |
| EP | 1 691 565 A1 | 8/2006 |
| EP | 1 793 561 A1 | 6/2007 |

OTHER PUBLICATIONS

Chinese Search Report in corresponding Chinese Application No. 201080065124.8 dated Aug. 11, 2014.
International Search Report issued in corresponding International application No. PCT/IB2010/000432, mailed Jun. 11, 2010.

* cited by examiner

*Primary Examiner* — Tu Nguyen
(74) *Attorney, Agent, or Firm* — Patent Portfolio Builders PLLC

(57) ABSTRACT

A server, computer readable medium and method for accessing buddy data related to a first user (presentity) that is connected to a communication network that includes a server, the data being accessed by a second user (watcher) connected to the communication network. The method including storing, at a server, information associated with a plurality of users associated with the presentity as the buddy data, receiving, at the server, a request from a watcher for buddy data of the presentity, authorizing, at least in part by the server, the request for buddy data, and transmitting, by the server, the buddy information to the watcher.

22 Claims, 8 Drawing Sheets

| DISPLAY NAME | ADDRESSABLE NAME | PUBLIC/PRIVATE |
|---|---|---|
| BILL503 | WATCHER1 | PUBLIC |
| SUSAN24 | WATCHER2 | PRIVATE |
| ⋮ | ⋮ | ⋮ |
| STEVED4 | WATCHERn | PUBLIC |

FIG. 3

PRESENTITY AUTHORIZATION OF BUDDY SUBSCRIPTION IN A COMMUNICATION SYSTEM

TECHNICAL FIELD

The present invention generally relates to communication systems, devices, software and methods and, more particularly, to mechanisms and techniques for authorizing a user to receive information related to another user in a communication system.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc. also allow the users to communicate via e-mail, video conferencing, IM, etc. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

Many communication applications allow for real-time or near real-time communication that falls outside of the traditional voice communication associated with wireline and wireless telephone communications. Chat sessions, instant messaging, Short Message Service (SMS), video conferencing, are a few such communication vehicles. Many of these types of communications are expected to become increasingly popular, particularly in view of the proliferation of wireless devices and continual technological breakthroughs.

In order to implement such technologies, "presence" technology is used to determine the location, willingness to communicate, and other parameters relating to real-time or near real-time communications. The presence technology generally refers to applications and services that facilitate location and identification of one or more endpoints to such communication links. For example, if a first user of a wireless, handheld device, intends to initiate an IM session with a second IM user, presence services may be used to present the second user's willingness to receive IM messages. Presence services are an integral part of third generation (3G) wireless networks, and are intended to be employed across a wide variety of communication devices.

Presence information may be created at a presence server or an associated system. Presence information may be a status indicator that conveys the ability and willingness of a potential user to communicate with other users. The presence server may provide the presence information for distribution to other users to convey the availability of the user for communication. Presence information is used in many communication services, such as IM and recent implementations of voice over IP communications.

More specifically, a user client may publish a presence state to indicate its current communication status. This published state informs others that wish to contact the user of his availability and willingness to communicate. One use of presence is to display an indicator icon on IM clients, for example a choice of a graphic symbol with an easy-to-convey meaning, and a list of corresponding text descriptions of each of the states. This is similar to the "on-hook" or "off-hook" state of a fixed telephone.

Common states regarding the user's availability are "free for chat", "busy", etc. Such states exist in many variations across different modern instant messaging clients. However, the standards support a rich choice of additional presence attributes that may be used for presence information, such as user mood, location, or free text status.

Presence service is typically implemented as a network service which accepts, stores and distributes presence information. The presence service may, for example, be implemented as a single server or may have an internal structure involving multiple servers and proxies. There may be complex patterns of redirection and proxying while retaining logical connectivity to a single presence service. Also presence service may be implemented as direct communication among presentity and watchers, i.e., a server is not required.

A number of entities may be implemented in a presence service architecture. One of these entities is referred to as the "Presentity", which is an entity that provides presence information. Another entity is the Presence Server, which receives presence information from presentities. The "Watcher" is an entity that is interested in the presence information.

The presence information (e.g., location, willingness to communicate at a certain time or with certain users, etc.) may be collected and utilized by presence servers, which may notify authorized Watchers who are interested in certain presence information. Watcher applications may be implemented in wireline and/or wireless terminals to obtain presence information from the presence servers about other users. This may come in the form of a notification, issued to the Watcher by the Presence Server.

Notifications to users/watchers that a targeted user/device has become available may be sent as complete or partial presence information. In other words, there are a number of different pieces of presence information that can be associated with the totality of the presence information. In a similar manner to the presence information and associated structure, there are location servers and location information regarding the users. The location information may include geographical location information.

Presence technology has been implemented in many different types of networks, including those using Session Initiation Protocol (SIP) for communications, such as networks operating in conformance with IP Multimedia Subsystem (IMS) standards. The basic SIP Presence XML PIDF document is described in IETF RFC 3863 and the basic SIP presence event package is defined in IETF RFC 3856. These RFCs describe how a Watcher can subscribe to presence information of a Presentity using SIP signaling. Once the Watcher has been authorized by the Presentity (e.g., using a presence.watcherinfo event package as described in IETF RFC 3857), changes to the presence information will be notified to the Watcher via SIP. The notification contains the presence information enclosed in the PIDF XML document.

The list of watchers associated with a Presentity is included in a Watcherinfo XML document. The Presentity subscribes to the presence.watcherinfo event of their own Watcherinfo XML document. This subscription is automatically authorized by the Presence system. When a new Watcher requests a subscription to the Presentity, it is added to the pending section of the Watcherinfo document, and this change is notified to the Presentity. The Presentity can now authorize (i.e., allow or reject) the new Watcher. In OMA/IMS, XCAP is used to edit the Presence authorization document. Once authorization is complete, the new Watcher gets to see the latest presence information (in case the subscription is still active or when a new subscription request is issued), i.e., a presence notification is sent to the Watcher as including the latest information of the Presentity.

Communities and social networks (e.g., Facebook, MySpace, Yahoo, MSN, and Google) are among the leading wireless service providers (WSPs) on the Internet today. Presence is already established in these Internet communities, with different solutions for different communities. A significant aspect of many Internet communities is the ability to extend one's own network by finding people who have a common interest, or by finding people who are friends of people you know yourself. The successful Social networks provide several ways to extend your network and interact with new people. This ability to extend your network is a significant aspect of such social networks and is used in so-called "viral marketing" to spread marketing messages amongst friends, and spread the message even wider as people add new friends.

However, care must be taken with people's social network information. People want to extend their social network, but also want to control the privacy and security regarding the information that is passed around in their social network. So this ability to extend a social network also needs to be coupled with proper security and privacy mechanisms.

Considering this social network functionality in the context of IMS networks, IMS provides a managed multimedia network with security and QoS capabilities. IMS is primarily for exchanging presence information and establishing multimedia sessions between users. In addition, IMS networks can be used to establish sessions between network servers and users. This make IMS networks valuable to Internet WSPs, where the IMS network is exposed to the WSPs via e.g., HTTP based interfaces such as RESTful or PARLAY-X. Two examples of how IMS Presence technology can be used to support a WSP web-site include: (1) enabling users of a web site to see other user's presence, and providing a presence engine, hosted in a IMS.Presence Server, to push content to users; and (2) enabling users subscribe to a content feed and notifying such users of content updates via the presence mechanisms.

However, presence usage within IMS (3GPP/OMA) specified systems is based upon the aforedescribed IETF RFCs. Thus, while there may be many watchers of the presence event package for a Presentity in IMS, there is typically only one watcher of the presence.watcherinfo event package— namely the Presentity itself. In other words, according to the standard, only the user can see the list of other users they are associated with, i.e., only the user can see its own list of authorized watchers. This means that there is no mechanism defined for IMS which would enable users to extend one's "buddy" or "friend" list, e.g., based upon information from other people's presence lists. Thus, the social networking and viral effects that are so successful on Internet web-sites are not supported in the IMS Presence systems today.

Accordingly, it would be desirable to provide devices, systems and methods for presence based applications that avoid the afore-described problems and drawbacks. More specifically, it would be desirable to provide mechanisms which enable buddy subscription in Presentities, with such mechanisms preferably employing authorization techniques that provide users with adequate security and privacy that they demand.

SUMMARY

The following exemplary embodiments provide a number of advantages and benefits relative to existing presence systems, devices and methods including, for example, the possibility to enable users to expand their contacts in, e.g., an IMS/presence system, by leveraging their existing relationships with presentities so that they can be introduced to other presentities. Advantageously, such introductions can be controlled in a number of different ways to take into account privacy concerns of the users. Other advantages include re-use of existing presence mechanisms according to some exemplary embodiments to provide buddy information which enables such introductions. It will be appreciated by those skilled in the art, however, that the claims are not limited to those embodiments which produce any or all of these advantages or benefits and that other advantages and benefits may be realized depending upon the particular implementation.

According to an exemplary embodiment, a method for obtaining buddy data associated with buddies of a presentity in a communication network includes the steps of storing, at a server, information associated with a plurality of users associated with the presentity as the buddy data, receiving, at the server, a request from a watcher for buddy data of the presentity, authorizing, at least in part by the server, the request for buddy data, and transmitting, by the server, the buddy information to the watcher.

According to another exemplary embodiment, a server administering access to buddy data related to a presentity connected to a communication network that includes the server, the data being accessed by a watcher connected to the communication network includes a memory device configured to store information associated with a plurality of users associated with the presentity as the buddy data, a processor, connected to the memory device, configured to receive a request from the watcher for buddy data of the presentity and to authorize, at least in part, the request for buddy data, and an interface configured to transmit the buddy information to the watcher.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 shows a data structure in which buddy data can be stored according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of presence servers discussed in the context of IMS systems. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
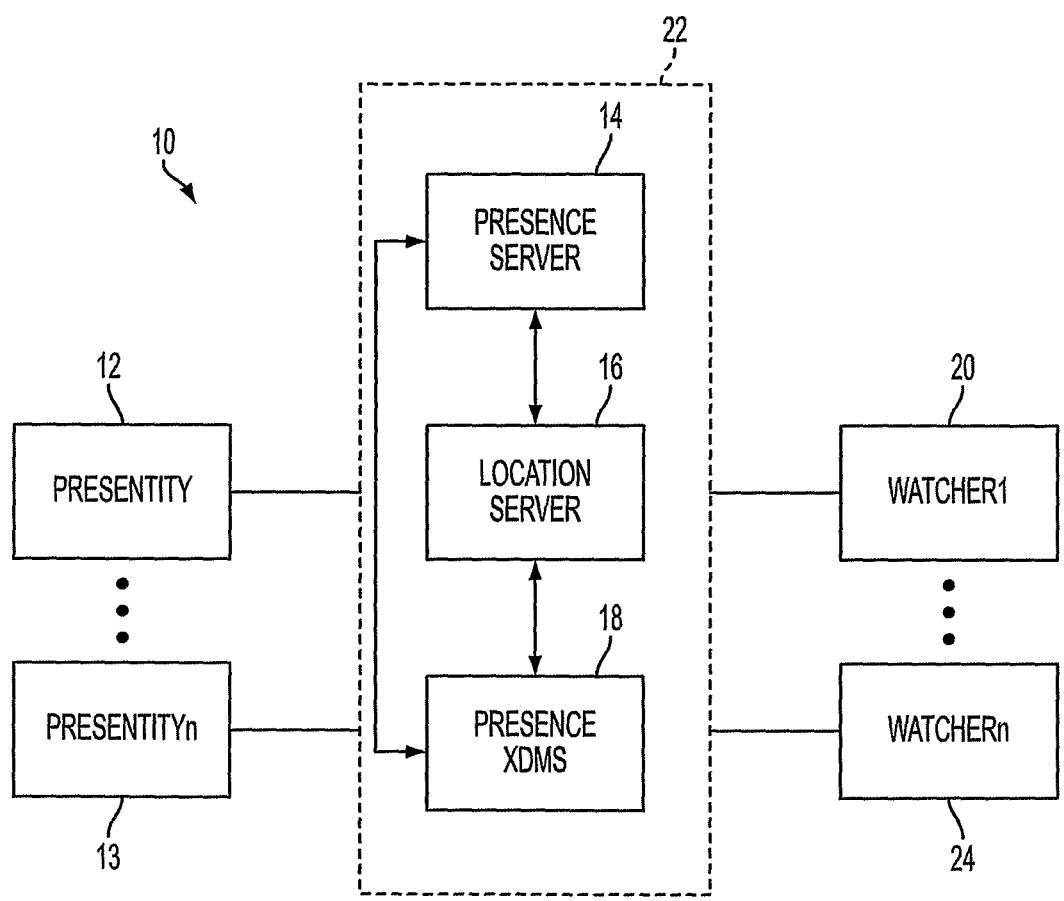
FIG. 1 is a schematic diagram of a communication system including user devices and various servers.

In order to provide some context for the subsequent discussion regarding buddy mechanisms according to exemplary embodiments, initially an overview of a system including a presentity, a presence server and multiple watchers in which such buddy mechanisms can be implemented is discussed. As shown in FIG. 1, according to an exemplary embodiment, a general communication system that uses presence data may include a plurality of presentities 1-n, represented by presentities 12 and 13, a presence server 14, an (optional) location server 16, a presence XDMS server 18, and a plurality of watchers 1-n, represented by watchers 20 and 24. The presence server 14, the location server 16, and the XDMS server 18 may be part of a single server 22 or may be implemented as separate servers located at separate physical locations. The presence server 14, the location server 16, and the presence XDMS server 18 may communicate directly to each other or via one of these servers as shown in FIG. 1. The communication path may be wireline or wireless. The presentities 12,13 and the watchers 20, 24 may communicate with each of the presence server 14, the location server 16, and the presence XDMS server 18 or may communicate via a single port (not shown) with the single server 22. The communication of the presentities 12, 13 and the watchers 20, 24 with the servers may be wireline or wireless.

The concept of "presence" and associated concepts are, for example, standardized by the Internet Engineering Task Force (IETF) and the standardization specifications, the entire content of which are incorporated by reference herein, may be found at http://www.ietf.org. Systems and methods which use presence can be found in various networks, including the networks described herein, and can be used to improve networks which use network based address books. A number of entities may be implemented in a presence server architecture. One of these entities is the presentity, which is an entity that provides presence information. Another entity is the presence server, which receives presence information from presentities. The watcher is an entity that is interested in the presence information, e.g., information indicating that other users and their respective devices are "online" and other related status information.

The presence information, e.g., location, willingness to communicate at a certain time or with certain users, information regarding business cards, etc., may be collected and utilized by presence servers, which may notify authorized "watchers" who are interested in certain presence information. Watcher applications may be implemented in wireline and/or wireless terminals to obtain presence information from the presence severs about other users. This may come in the form of a notification, issued to the watcher by the presence server. The presence entities may use Session Initiation Protocol (SIP) as a presence protocol and uses a general event notification framework defined for SIP, and as such, makes use of the SUBSCRIBE and NOTIFY methods defined in the presence specifications.

An event package, which is introduced in the presence system and is defined in RFC 3265, is based on the concept of a presence agent, which is a logical entity that is capable of accepting subscriptions, storing subscription state, and generating notifications when there are changes in presence. The entity is defined as a logical one, since it may be co-resident with another entity. A Presence User Agent (PUA) manipulates presence information for a presentity. This manipulation can be the side effect of some other action (such as using an Extensible Markup Language (XML) Configuration Access Protocol (XCAP) PUT message to add a new Contact) or can be performed explicitly through the publication of presence documents, e.g., using SIP PUBLISH. A user may have many devices, such as a cell phone and a personal digital assistant (PDA), each of which may be independently generating a component of the overall presence information for a presentity. PUAs push data into the presence system, but are outside of it, in that they do not receive SUBSCRIBE messages or send NOTIFY messages.

A presence agent (PA) is a SIP user agent which is capable of receiving SUBSCRIBE requests, responding to them, and generating notifications of changes in the presence state. A presence agent may have knowledge of the presence state of a presentity. This means that it has access to presence data manipulated by PUAs for the presentity. A PA is also a notifier (as defined in RFC 3265) that supports the presence event package.

A presence server is a physical entity that may act as either a presence agent or as a proxy server for SUBSCRIBE requests. When acting as a PA, it is aware of the presence information of the presentity through some protocol means. When acting as a proxy, the SUBSCRIBE requests are proxied to another entity that may act as a PA. When an entity, the subscriber, wishes to learn about presence information from some other user, it creates a SUBSCRIBE request. The SUBSCRIBE request is carried along SIP proxies as other SIP requests. In most cases, it eventually arrives at a presence server, which may either generate a response to the request (in which case it acts as the presence agent for the presentity), or proxy it on to an edge presence server. If the edge presence server handles the subscription, it is acting as the presence agent for the presentity.

The presence agent, whether in the presence server or edge presence server, first authenticates the subscription, then authorizes it. If authorized, an OK response is returned. If authorization could not be obtained at this time, the subscription is considered "pending", and another response is returned. In both cases, the PA sends an immediate NOTIFY message containing the state of the presentity and of the subscription. As the state of the presentity changes, the PA generates NOTIFYs containing those state changes to all subscribers with authorized subscriptions. Changes in the state of the subscription itself can also trigger NOTIFY requests, that state is carried in the Subscription-State header field of the NOTIFY message, and would typically indicate whether the subscription is active or pending.

In many communications applications, such as Voice over IP, instant messaging, and presence, the network servers may access per-user information in the process of servicing a request. This per-user information may reside within the network, but may be managed by the end user themselves, and its management can be performed through a multiplicity of access points, including the web, a wireless handset, or a PC application.

There are many examples of per-user information. One is presence authorization policy, which defines rules about which watchers are allowed to subscribe to a presentity, and what information they are allowed to access. Another is presence lists, which are lists of users whose presence is desired by a watcher. One way to obtain presence information for the list is to subscribe to a resource which represents that list. In this case, the Resource List Server (RLS) requires access to this list in order to process a SIP SUBSCRIBE request for it. Another way to obtain presence for the users on the list is for a watcher to subscribe to each user individually. In that case, it is convenient to have a server store the list, and when the client boots, it fetches the list from the server. This would allow a user to access their resource lists from different clients.

A protocol that may be used to manipulate this per-user data is XCAP. XCAP is a set of conventions for mapping XML documents and document components into hypertext transport protocol (HTTP) Uniform Resource Identifiers (URIs), rules for how the modification of one resource affects another, data validation constraints, and authorization policies associated with access to those resources. Using this structure, normal HTTP primitives may be used to manipulate the data.

Each application (where an application refers to a use case that implies a collection of data and associated semantics) that makes use of XCAP specifies an application usage. This application usage defines the XML schema for the data used by the application, along with other pieces of information. One task of XCAP is to allow clients to read, write, modify, create and delete pieces of that data. An XCAP server acts as a repository for collections of XML documents. There may be documents stored for each application. Within each application, there are documents stored for each user. Each user may have a multiplicity of documents for a particular application. To access some component of one of those documents, XCAP defines an algorithm for constructing a URI that may be used to reference that component. Components refer to any element or attribute within the document. Thus, the HTTP URIs used by XCAP point to a document, or to pieces of information that are finer grained than the XML document itself. An HTTP resource which follows the naming conventions and validation constraints defined here is called an XCAP resource. Because XCAP resources are also HTTP resources, they can be accessed using HTTP methods. Reading an XCAP resource is accomplished with HTTP GET, creating or modifying one is done with HTTP PUT, and removing one of the resources is done with an HTTP DELETE. With this presence background, which can be used in support of and/or in conjunction with exemplary embodiments described herein, examples of buddy mechanisms according to exemplary embodiments are now described below.

According to an exemplary embodiment, a mechanism is provided which enables, for example, a Watcher 20 to request access to the buddy data of a Presentity 12 to which it is already subscribed, and to allow the Presentity 12 to authorize the Watcher 20 to have access to this buddy data (or some part of it). From this buddy data, the user can then contact other users, e.g., to expand his or her contact list.

Figure 2:
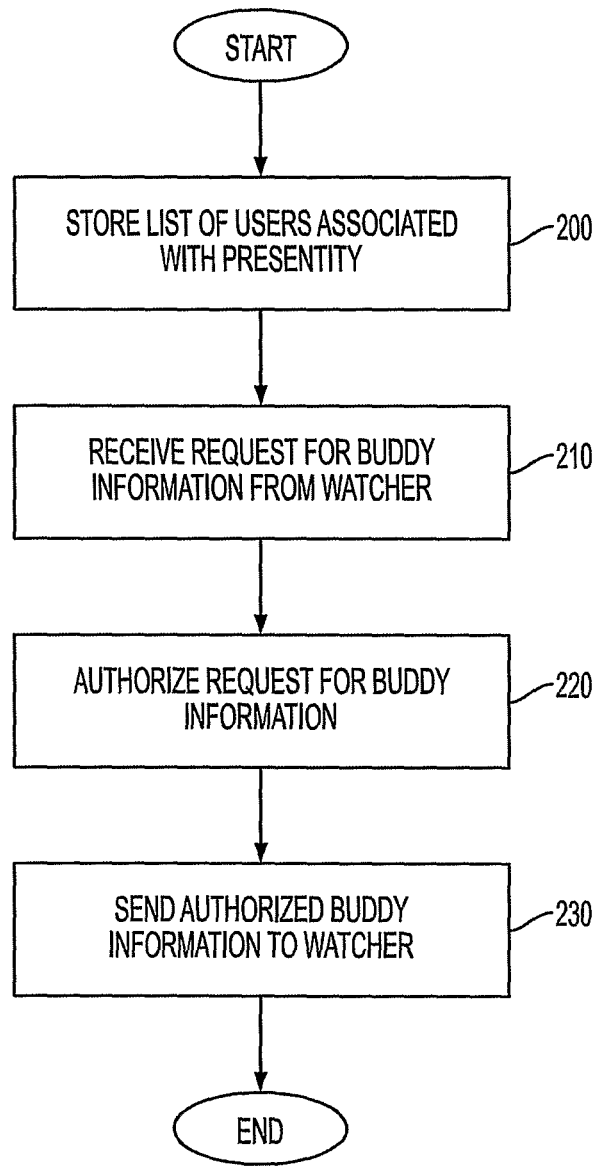
FIG. 2 is a flowchart depicting a method for transmitting buddy data to a user according to an exemplary embodiment.

A general method for sending buddy information associated with a Presentity (one user) to a Watcher (another user) in an IMS system is shown in the flowchart of FIG. 2, in this example from the point of view of the Presentity 12 and/or the presence server 22. That is, all of the steps illustrated in FIG. 2 can be performed by a Presentity 12, all of the steps can be performed by the presence server 22 or one or more of the steps can be performed by each. Therein, at step 200, a list of users (buddies) associated with Presentity 12, e.g., including a subset (or, possibly, the complete set) of the Watchers 1 . . . N, is established/stored. According to exemplary embodiments, the Watcher 20 can subscribe to this buddy list (or parts of this buddy list) to obtain information about users associated with Presentity 12, e.g., by sending a SIP message to the Presentity 12 requesting buddy information as indicated by step 210.

However, as shown in step 220, the Presentity 12 will first perform an authorization process to determine whether to grant the requesting (subscribing) user access to this buddy information. If the Watcher 12 is granted authorization to access some or all of the buddy information, the Presentity 12 will then send the authorized buddy information to the subscribing user. Once authorized, buddy information can be updated on a subscription basis, e.g., in a manner similar to that by which presence information is provided to subscribing users. This buddy information by the subscribing user can then be used to, for example, expand his or her contact list associated with the IMS system. Each of the steps illustrated in FIG. 2 will now be described in more detail.

Starting with step 200, a Presentity 12 will, according to exemplary embodiments, store its buddy information in a suitable data structure, e.g., a list or database, so that it can make such buddy information available to authorized subscribers. The buddy information can, for example, be stored in a memory device associated with the Presentity 12 and can include one or more of the data elements illustrated in the exemplary buddy list 300 shown in FIG. 3. Exemplary memory devices are described below with respect to FIGS. 7 and 8.

Therein, the data structure (buddy list) 300 includes one or more data elements associated with each buddy in the list. For example, each buddy can be represented in the buddy list by one or more of: a display name, an addressable name, and a public/private indicator. According to one exemplary embodiment, when a user requests buddy information from a Presentity 12, and is authorized to receive such data, the Presentity 12 may send that user only a display name associated with one of its buddies. The display name is usable, as described below, to request contact with that buddy via the Presentity 12, but not usable by the requesting Watcher to directly contact the buddy. Alternatively, the buddy list can include an addressable name associated with each buddy in the list 300. The addressable name can be used by the Watcher who requested the buddy information to directly contact the buddy, e.g., to ask that user if it is ok to add him or her to the Watcher's presence list, without necessarily going through Presentity 12 for the introduction. The buddy list 300 may also include a public/private indicator associated with each buddy in the list. This indicator can be used by the buddies, and by Presentity 12, to selectively filter out some buddies who prefer that their names not be shared in response to a request for buddy information from a Watcher 20, 24. If used in the buddy list 300, a successful requester of buddy information would then only receive the display name or addressable name of those users in the list that have been flagged as "public".

In addition to the type and amount of information which is stored for each user in a buddy list, the manner in which users are selected for storage in a Presentity 12's buddy list may also vary according to exemplary embodiments. There are a number of possible lists that could be used as buddy list 300 according to exemplary embodiments and these can be grouped generally into two categories—static lists & dynamic lists. There are three static lists held in the XDMS server 18 which respectively describe: 1) all users who the Presentity has granted permission to watch their presence, 2) all users who the Presentity has blocked from watching their presence, and 3) all known users (i.e., List 1+List 2). There are also dynamic lists held in the presence server 22 regarding who is currently subscribed to watch the Presentity 12. These dynamic lists will typically hold a subset of the users on the static list which lists all those users who are allowed to watch (i.e., who are allowed to receive presence information. For example, one dynamic list can include those active watchers that are online, i.e., excluding those who are allowed to watch, but who are currently not watching. The dynamic list of those currently watching is the watcherinfo list. Any one of these lists, or any other list of users, can be used as buddy list 300 according to various exemplary embodiments.

Having buddy list information stored and available for use (step 200), a Presentity 12, and/or the presence server 22, can receive requests to subscribe to the Presentity 12's buddy information, e.g., from one of its already subscribed Watchers 20, 24 at step 210. This can be accomplished by, for example, the Presentity 12 (and/or the presence server 22) receiving a SIP message requesting buddy information (step 210) which has been transmitted by a Watcher 20, 24 as will be described in more detail below with respect to FIG. 4.

At step 220, the Presentity 12 and/or the presence server 22, processes a received buddy information request to determine whether the requester is authorized to receive such information. This can be accomplished, according to exemplary embodiments, in a number of different ways. For example, the presence server 22 may first receive the request from a Watcher 20, 24 and apply a policy thereto. An exemplary policy for authorizing buddy list information requests at the presence server 22 is to determine whether the requesting Watcher 20, 24 is a buddy of Presentity 12 (e.g., listed on the allowed list for Presentity 12 in the Presence XDMS 18). Alternatively, if the presence server 22 determines that the requesting Watcher 20, 24 is a buddy of the Presentity 12 whose buddy information it is requesting, then the presence server 22 can authorize release of that Presentity 12's public buddy information.

Various other authorization mechanisms are also contemplated. For example, if the presence server 22 detects that a Watcher 20, 24 who is requesting buddy information is not in the allowed (or, similarly, is on the blocked) list of the Presentity 12 for whom the Watcher 20, 24 is requesting buddy information, then the presence server 22 can treat the request for buddy information as a presence subscription request. That is, under these circumstances, the presence server 22 can send a watcher info notification to the Presentity 12 whose buddy information was requested to determine if the requesting Watcher 20, 24 can first be qualified to receive presence information. In this exemplary embodiment, the Presentity 12 is notified of the new subscription request, i.e., because Presentity 12 is subscribed for changes. Suppose that, for the sake of this example, Presentity 12 decides to accept the request for the Watcher 20, 24 to become a subscriber to its presence information. In this case, the Presentity 12 edits the presence authorization rules to approve the request and Watcher 20, 24 receives a successful response to the subscription to the list of associated users. According to another exemplary embodiment, the presence server detects that Watcher 20, 24 is requesting buddy information (rather than presence information) and acts as though this Watcher 20, 24 is not in the allowed list of Presentity 12 and so sends a watcher info notification to Presentity 12, because Presentity 12 is subscribed for changes as normal and, therefore, edits the presence authorization rules to approve/reject the request. The presence authorization rules now capture the distinction between users who can watch the presence info for Presentity 12 and users who can watch the buddy information of Presentity 12.

It will be appreciated from the foregoing that at least some exemplary embodiments will result in different levels of authorization to receive data from Presentities, i.e., some Watchers 20, 24 may be authorized to receive only presence information, other Watchers 20, 24 may be authorized to only receive buddy information and/or that some Watchers 20, 24 may be authorized to receive both types of information associated with a particular Presentity 12. Thus, for such exemplary embodiments, the presence authorization rules will capture these distinctions, e.g., between users who can watch the presence data for Presentity 12 and users who can watch the buddy list of Presentity 12. For other exemplary embodiments, these different levels can be reduced to one, e.g., wherein all authorized Watchers can receive both presence information and buddy information.

Figure 4:
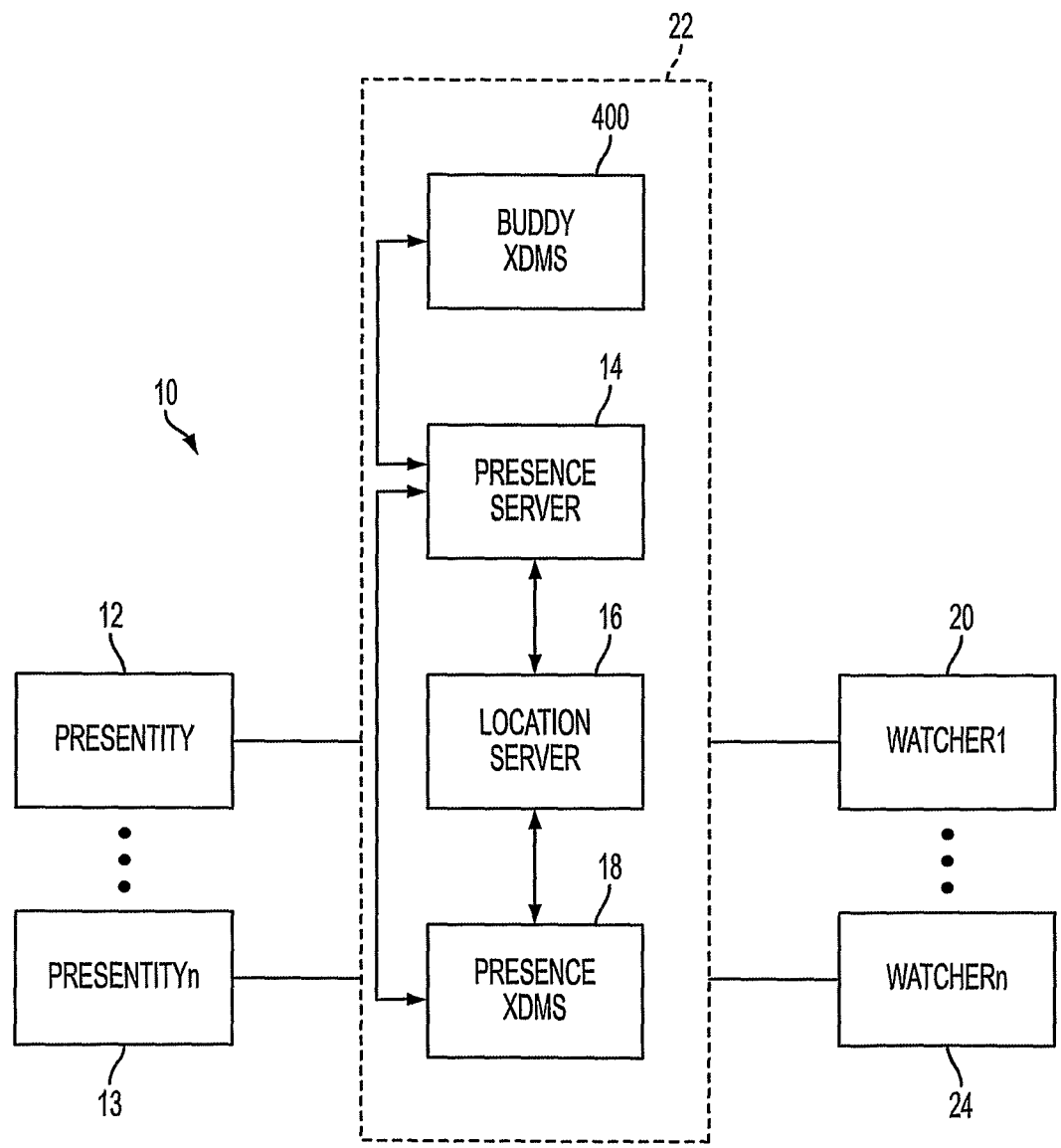
FIG. 4 is a schematic diagram of a communication system including user devices and various servers including a buddy XDMS according to an exemplary embodiment.

Whereas in the previous exemplary embodiment the authorization step 220 is performed using a modified version of existing presence authorization mechanism and a presence authorization document, another solution would be to add a new authorization mechanism separate from, but similar to, the presence solution, e.g., a Buddy authorization XDMS 400 is introduced as shown in FIG. 4, wherein the remaining elements are numbered and operate as described above with respect to FIG. 1. According to this exemplary embodiment, the watcher info subscription authorization and the presence authorization mechanisms can re-use the same basic functionality but different authorization documents are used, i.e., a presence authorization document and a buddy list authorization document are both used. Yet another alternative for performing the authorization step 220 according to an exemplary embodiment is to have the Presentity 12 subscribe to watcher info of the watcher info, in which case Watcher 20, 24's subscription to watcher info would result in a notification to Presentity 12 within that subscription. To expand on this exemplary embodiment, consider that typically a User A subscribes to their own watcherinfo and when user B subscribes to user A for Presence, then user A gets notifed of the change via watcherinfo. However, according to this exemplary embodiment, it is further desirable for user B to subscribe to the watcherinfo of A, and thus an additional mechanism is needed to notify user A. One option for providing this mechanism is to overload the presence.winfo event. In such a case, the presence server is configured to determine that a particular SUBSCRIBE signal is from user B and then it shall notify user A. Another option for providing this mechanism according to an exemplary embodiment separates these functions more explicitly. In this second case, user A subscribes to Watcherinfo (i.e., to obtain notifications of presence subscribes) and user A also subscribes to new event presence.winfowinfo (i.e., to obtain notifications of Buddyinfo subscribes).

Once authorization is completed, and assuming that the requesting Watcher 20, 24 is authorized to receive buddy information, then that information is delivered to the Watcher 20, 24 as indicated by step 230. As mentioned earlier, the actual buddy information which is delivered to the Watcher 20, 24 can vary from implementation to implementation, or even within a single implementation based on the Watcher's access level if varying levels of access are provided. For example, the delivered buddy information could include the full information about all watchers on the Presentity 12's buddy list, the full information but only for those watchers who allow their buddy information to be distributed, the full information but only for the currently subscribed watchers or a subset of the buddy list information, e.g., a public part of the information, for any of the groups of watchers mentioned above. According to exemplary embodiments, and also as described above, this latter mechanism can involve usage of a new XML document format that only provides the public elements of watcherinfo, and only gives user display names, rather than full user ids. Moreover, providing only a public portion of the buddy list information can be implemented as a configurable mechanism and not require a new user management mechanism.

Figure 5:
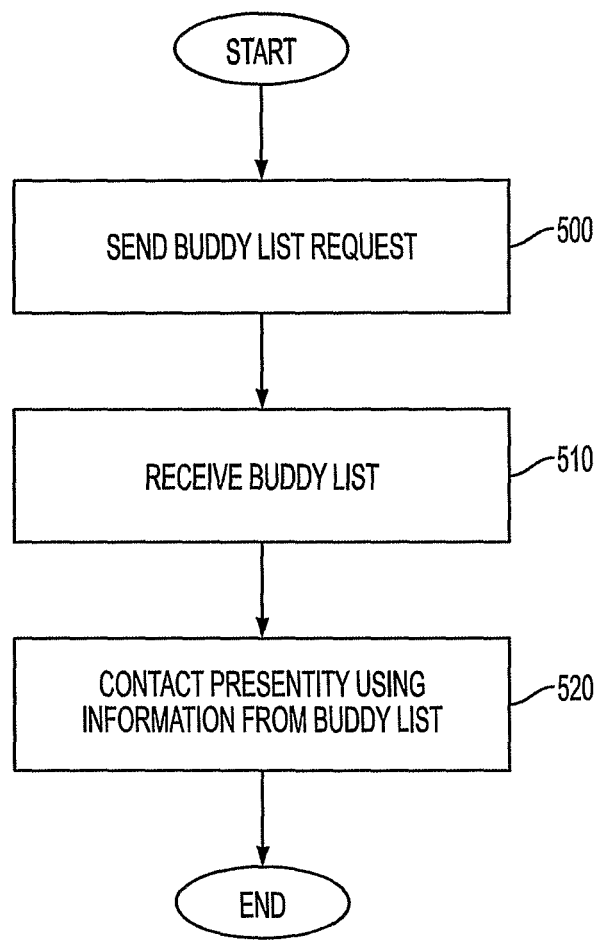
FIG. 5 is a flowchart illustrating buddy data handling from the perspective of a user device according to an exemplary embodiment.

In addition to considering buddy mechanisms from the perspective of the Presentity 12 (and/or the presence server 22), other exemplary embodiments also consider buddy information from the perspective of the Watcher 20, 24 as shown generally in the flow diagram of FIG. 5. Therein, at step 500, a Watcher 20, 24 sends a request for buddy information and, subsequently receives a response at step 510, e.g., a buddy list. Subsequent to receipt of the buddy information, Watcher 20, 24 then decides to contact one of Presentity 12's buddies, e.g., Presentity 13, using the buddy information, e.g., in order for Watcher 20, 24 to expand its group of friends, at step 520. Step 520 can be performed in a number of different ways according to exemplary embodiments depending upon, at least in part, the information which was received in the buddy list.

For example, suppose that the Watcher 20 decides that it would like to communicate with one of the elements from the buddy list of Presentity 12 which it received in response to a buddy list request. The target user is identified as Presentity 13, however Watcher 20 only has the display name for Presentity 13 (which it received in step 510) and so cannot subscribe directly to the presence information of Presentity 13. Accordingly, Watcher 20 sends a request to Presentity 12 asking that Presentity 12 should request Presentity 13 to allow Watcher 20 to subscribe to its presence information. Presentity 13 can approve or reject this request, or the request can be automatically granted if Watcher 20 is a buddy of Presentity 12. According to one exemplary embodiment, this functionality to contact a buddy of Presentity 12 can be implemented as a subscribe request from Watcher 20 to Presentity 12 indicating that the subscription is meant for Presentity. The presence server 22 then relays the request to Presentity 13 indicating that, for example, the request is a third party subscription initiated by Watcher 20 and relayed by Presentity 12.

According to another exemplary embodiment, a REFER mechanism can be used wherein a REFER message is sent to Presentity 13 as a result of the subscription request of Watcher 20. As yet another alternative Presentity 12 may indicate to Watcher 20 that he or she allows the subscription (to contact Presentity 13), and the full id of Presenity 13 is returned to Watcher 20. Watcher 20 can then send a normal subscribe message using the full identity of Presentity 13, and Presentity 13 can approve or reject this subscription.

Figure 6:
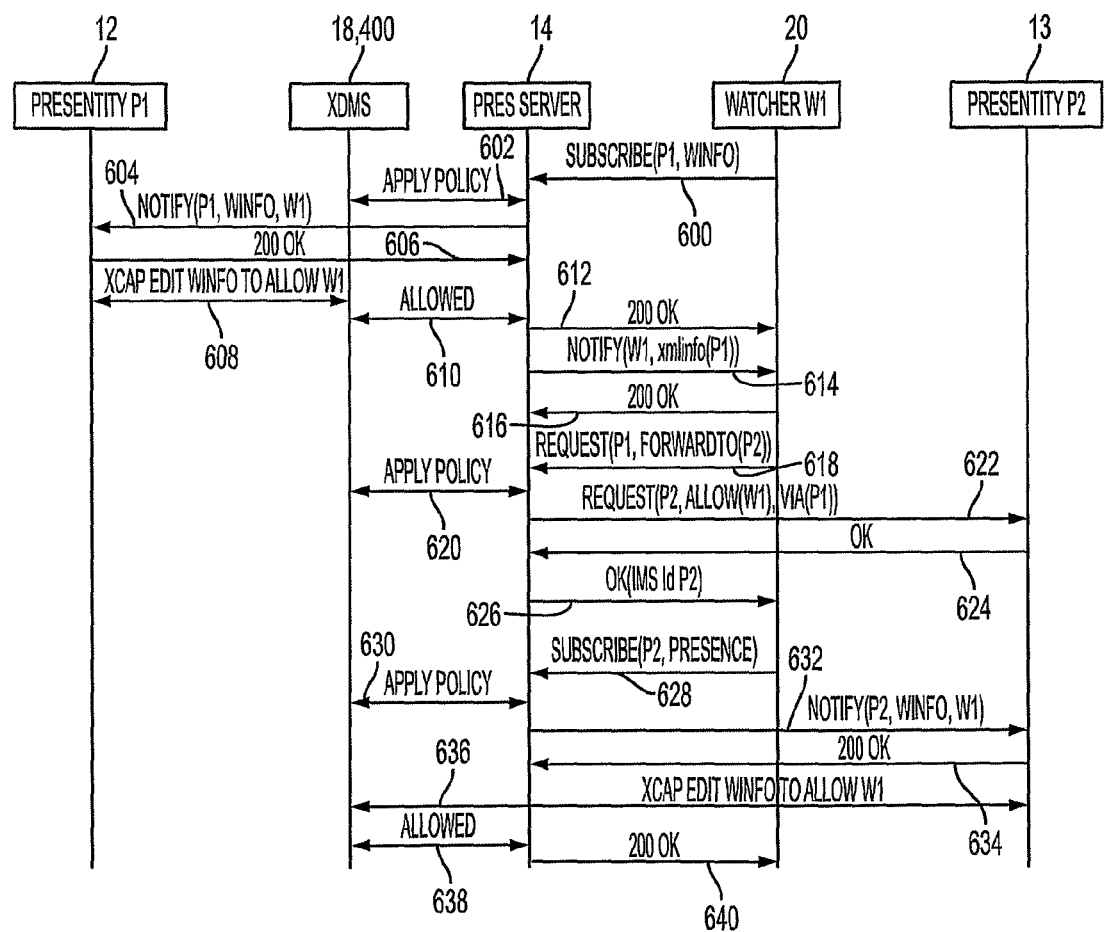
FIG. 6 is a signaling diagram according to an exemplary embodiment.

As described above, some exemplary embodiments involve the transmission or reception of, e.g., SIP signals in IMS systems, which facilitate the request for, authorization of, and delivery of, buddy information. Accordingly, a detailed (yet still purely illustrative) signal diagram according to an exemplary embodiment will now be described with respect to FIG. 6. Therein, Watcher 20 is already authorized to watch Presentity 12, i.e., to receive presence information about Presentity 12. Watcher 20 now wishes to obtain access to the buddy data of Presentity 12. The signaling sequence of FIG. 6 shows how, according to one exemplary embodiment, Watcher 20 requests permission from Presentity 12 to have access to the buddy data of Presentity 12, and then how that Watcher 20 subsequently requests permission to subscribe to the presence data of Presentity 13 (who is one of the buddies of Presentity 12). In this example, authorization of the buddy information request is performed by re-using the Watcher-Info list, which is normally used for supplying presence information, and applying a new authorization policy to that list to determine authorization to obtain buddy information. However, other authorization mechanisms are possible and contemplated, some of which were described above.

Starting with signal 600, Watcher 20 subscribes to the buddy data of Presentity 12 by transmitting signal 600 to the presence server 22. In this embodiment, signal 600 is exemplified as a SIP SUBSCRIBE (to watcher-info of Presentity 12) signal, although other types of signals can alternatively be used to request buddy information. Presence server 22 and XDMS 18 or 400 apply policy as indicated by signaling 602, e.g., in one of the ways described above, and decide to pass the request on to Presentity 12 for authorization via a SIP NOTIFY signal 604.

After acknowledging receipt of the request via SIP 200 OK message 606 to the presence server 22, Presentity 12 edits the XDMS document associated with presence/buddy authorization to give its authorization for Watcher 20 to receive buddy information and to inform the XDMS 18 or 400, as shown by the XCAP signaling 608. The presence server 14 is notified, which subsequently acknowledges the original SIP SUBSCRIBE signal 600 via SIP 200 OK signal 612, and then informs the Watcher 20 of the buddy information via signal 614. In this example, only the public portion of Presentity 12's buddy information is sent to Watcher 20 which, as described above, includes basic information about the buddies of Presentity 12, one entry of which is for Presentity 13.

Suppose that in this exemplary scenario Watcher 20 wishes to obtain presence information from Presentity 13. According to this example, the Watcher 20 needs to do this via referral from Presentity 12, although other mechanisms could alternatively be used as described above. Thus, Watcher 20 requests Presentity 12 (via presence server to refer him to Presentity 13 via signal 618 and to request that Watcher 20 can subscribe to presence data of Presentity 13. After applying policy to determine if Watcher 20 is authorized (signal 620), Presentity 12 passes on the request to Presentity 13 via signal 622 who authorizes the request via signal 624. The response signal 626 to Watcher 20 includes the full identity of Presentity 13, as opposed to, e.g., the display name which was provided to Watcher 20 as all or part of the public information in signal 614.

Watcher 20 then subscribes to the presence data of Presentity 13 via signal 628. After applying policy to determine if this request is authorized via signaling 630, presence server 14 then notifies Presentity 13 of the request via signal 632, which signal is acknowledged via signal 634. Presentity 13 edits its XDMS document by wavy of signaling 636 toward XDMS 18 or 400 to give its authorization to Watcher 20's request, and a response signal is then sent to Watcher 20 indicating its authorization to receive presence information from Presentity 13 via signals 638 and 640.

Terminals that may act as presentity and/or watchers as described in connection with the exemplary embodiments may be desktop/personal computers, workstations, large-scale computing terminals, wireless terminals, or any other computing device capable of executing presence awareness applications. The wireless terminals may include devices such as wireless/cellular telephones, personal digital assistants (PDAs), or other wireless handsets, as well as portable computing devices. The mobile terminals may utilize computing components to control and manage the conventional device activity as well as the functionality provided by the exemplary embodiments. Hardware, firmware, software or a combination thereof may be used to perform the various methods and techniques described in this document.

Figure 7:
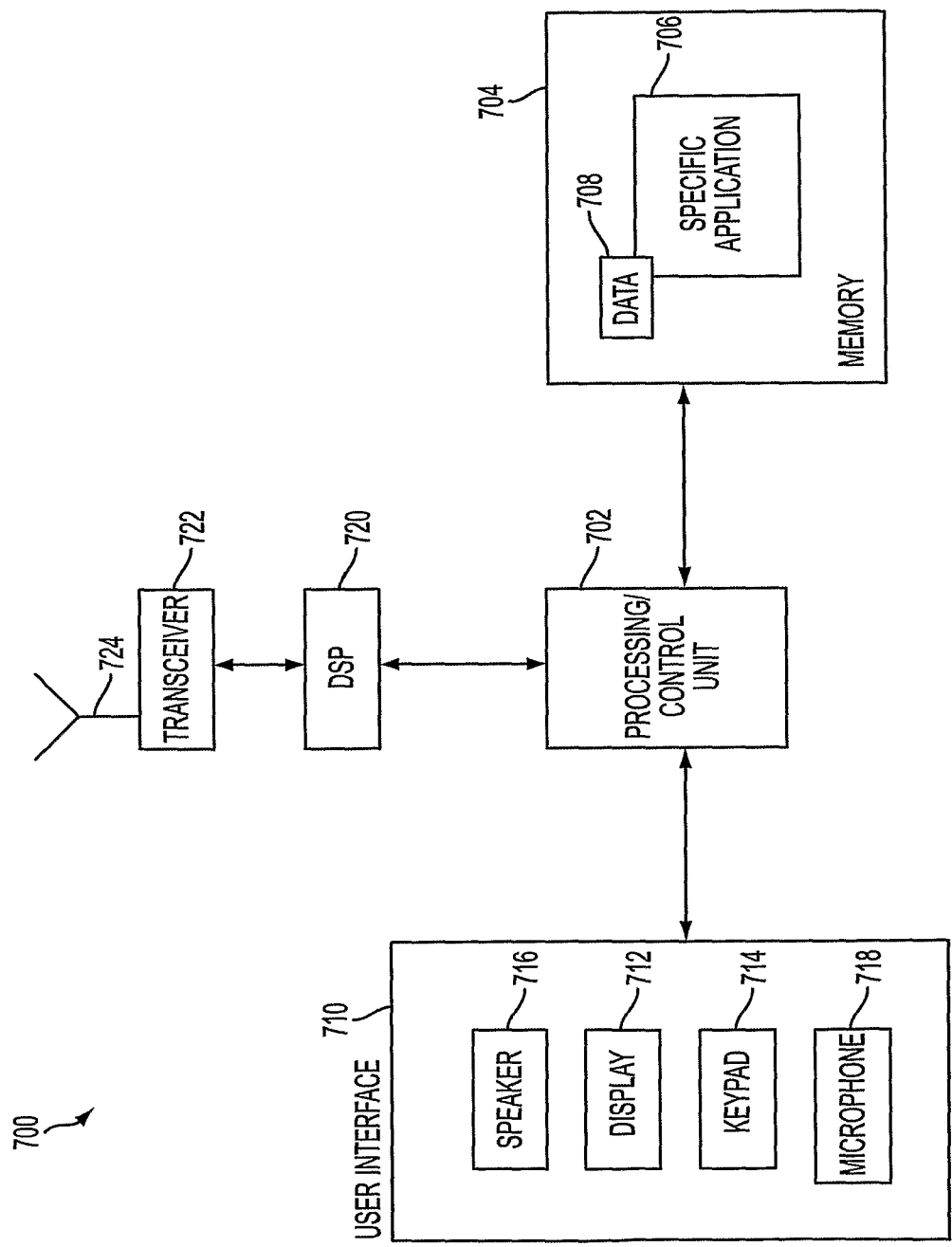
FIG. 7 is a schematic diagram of a user terminal.

For purposes of illustration and not of limitation, an example of a representative mobile terminal computing system capable of carrying out operations in accordance with the exemplary embodiments as, e.g., a presentity or watcher, is illustrated in FIG. 7. It should be recognized, however, that the principles of the present exemplary embodiments are equally applicable to standard computing systems.

The exemplary mobile computing arrangement 700 may include a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor.

The processing unit 702 may control the basic functions of the mobile terminal as dictated by programs available in the storage/memory 704. Thus, the processing unit 702 may execute the functions described in FIGS. 2, 3, 5 and 6. More particularly, the storage/memory 704 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 700 via data signals, such as being downloaded electronically via a network, such as the Internet.

One of the programs that may be stored in the storage/memory 704 is a specific program 706. As previously described, the specific program 706 may interact with a buddy server and/or a presence server to fetch and/or subscribe to presence information and/or buddy information of one or more presentities. The specific program 706 and associated features may be implemented in software and/or firmware operable by way of the processor 702. The program storage/memory 704 may also be used to store data 708, such as the various authentication rules, or other data associated with the present exemplary embodiments. In one exemplary embodiment, the programs 706 and data 708 are stored in non-volatile electrically-erasable, programmable ROM (EEPROM), flash ROM, etc. so that the information is not lost upon power down of the mobile terminal 700.

The processor 702 may also be coupled to user interface 710 elements associated with the mobile terminal. The user interface 710 of the mobile terminal may include, for example, a display 712 such as a liquid crystal display, a keypad 514, speaker 716, and a microphone 718. These and other user interface components are coupled to the processor 702 as is known in the art. The keypad 714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 700 may also include a digital signal processor (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. The transceiver 722, generally coupled to an antenna 724, may transmit and receive the radio signals associated with a wireless device.

The mobile computing arrangement 700 of FIG. 7 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 706 and associated features, and data 708, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

Figure 8:
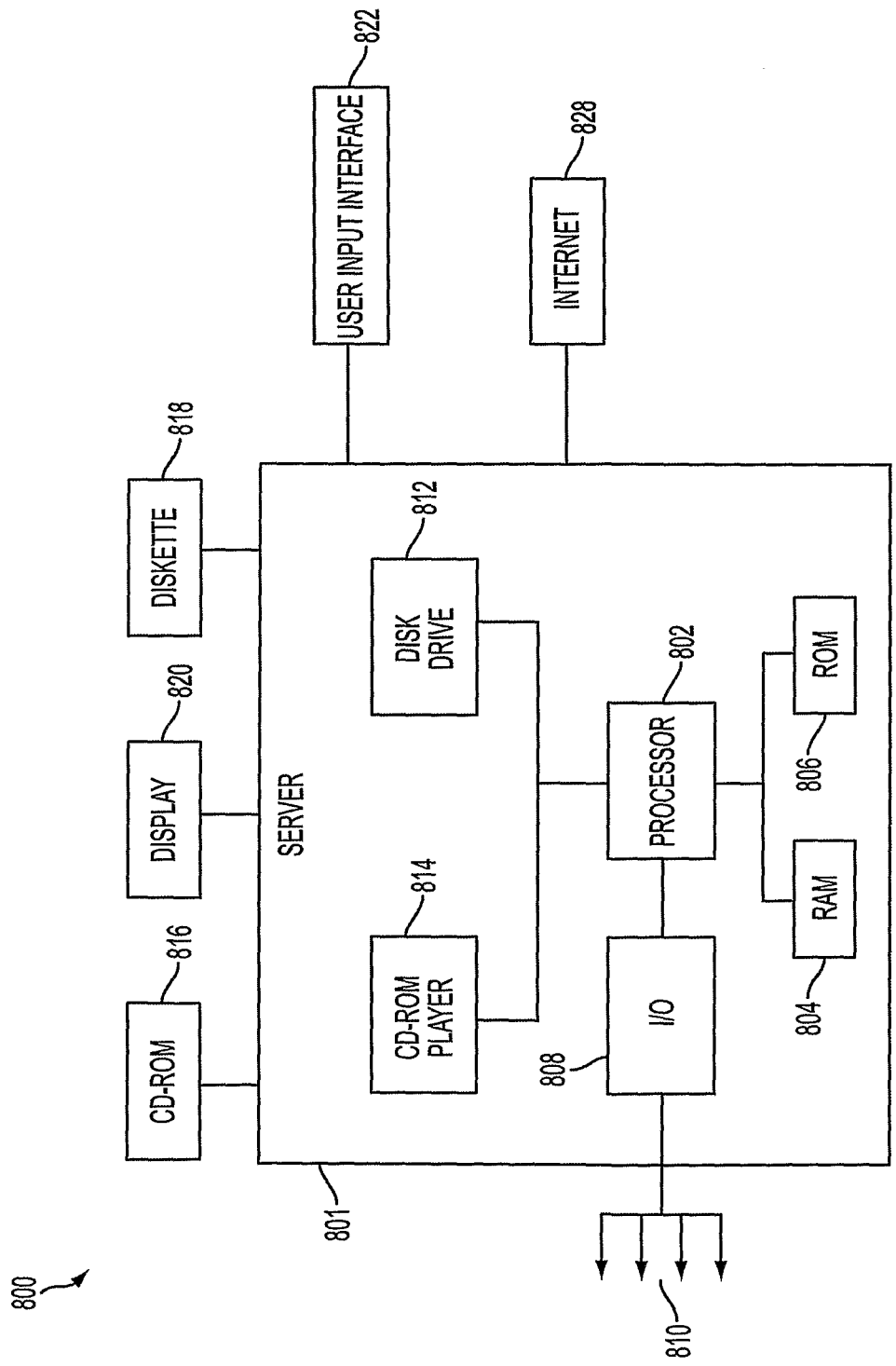
FIG. 8 is a schematic diagram of a server.

The presence server, presence and/or buddy XDMS servers or other systems for providing presence and location information in connection with the present exemplary embodiments may be any type of computing device capable of processing and communicating presence information. An example of a representative computing system capable of carrying out operations in accordance with the servers of the exemplary embodiments is illustrated in FIG. 8. Hardware, firmware, software or a combination thereof may be used to perform the various steps and operations described herein. The computing structure 800 of FIG. 8 is an exemplary computing structure that may be used in connection with such a system.

The exemplary computing arrangement 800 suitable for performing the activities described in the exemplary embodiments may include a presence server or a buddy server or a presence and/or buddy XDMS server 601. Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as is known in the art, as dictated by software and/or firmware instructions.

The server 801 may also include one or more data storage devices, including hard and floppy disk drives 812, CD-ROM drives 814, and other hardware capable of reading and/or storing information such as DVD, etc. In one embodiment, software for carrying out the above discussed steps may be stored and distributed on a CD-ROM 816, diskette 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touch pad, touch screen, voice-recognition system, etc.

The server 801 may be coupled to other computing devices, such as the landline and/or wireless terminals and associated watcher applications, via a network. The server may be part of a larger network configuration as in a global area network (GAN) such as the Internet 828, which allows ultimate connection to the various landline and/or mobile client/watcher devices.

The disclosed exemplary embodiments provide, for example, a user terminal, a system, a method and a computer program product for obtaining buddy data of a certain user or presentity in an IMS system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

For example, although the foregoing exemplary embodiments describe that the single set of authentication rules (e.g., the rules used to generate the authentication privileges for a user for both the buddy data and the presence data) can be stored according to one exemplary embodiment on a presence data management server, it will be appreciated that the particular name and/or location of the server which stores the single set of rules can be varied. For example, this server could also be referred to as a "presence and buddy authorization rules server". The server, regardless of its name, could be dedicated to the storage of such rule sets or, alternatively, could also be used to store other, e.g., similar, data. In the latter case, the server could then be referred to, for example, as a "content based authorization rules server". For the purposes of this specification, the term "presence and buddy authorization rules server" shall be generic to all such servers which may be used to store the rule sets described herein.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for obtaining buddy data associated with buddies of a presentity in a communication network, the method comprising:
    storing, at a server, information associated with a plurality of users associated with said presentity as said buddy data;
    receiving, at said server, a request from a watcher for buddy data of said presentity;
    authorizing, at least in part by said server, said request for buddy data; and
    transmitting, by said server, said buddy information to said watcher,
    wherein said buddy data includes information which identifies another presentity, but which information is not usable to directly contact said another presentity, and
    wherein the method further comprising
    receiving, at said server, a request from said watcher to subscribe to presence information associated with said another presentity; and
    forwarding, by said server, said request to said another presentity as a message which is relayed from said presentity.

2. The method of claim 1, wherein said watcher is already authorized to receive presence information associated with said presentity when said watcher requests said buddy data.

3. The method of claim 1, wherein said buddy data includes information which identifies another presentity and which information is usable to directly contact said another presentity.

4. The method of claim 3, further comprising:
    receiving, at said server, a request from said watcher to subscribe to presence information associated with said another presentity; and
    forwarding, by said server, said request to said another presentity.

5. The method of claim 1, wherein said step of storing, at said server, said buddy data further comprises:
    storing a plurality of data elements for each of said users as said buddy data, wherein at least one of said data elements is indicated as a public data element and at least one of said data elements is indicated as a private data element.

6. The method of claim 5, wherein said step of transmitting said buddy data further comprises:
    transmitting only data elements in said buddy data which are indicated as public data elements.

7. The method of claim 1, wherein said stored information associated with a plurality of users is one of: a first list of currently subscribed presence users associated with said presentity, a second list of allowed users, and a third list which is different than said first and second lists.

8. The method of claim 1, wherein said step of authorizing, at least in part by said server, said request for buddy information further comprises:
    determining, by said server, whether said watcher is part of an allowed user list in a Presence XDMS associated with said presentity;
    if so, sending a request to said presentity which asks said presentity to authorize transmission of said buddy data; and
    if not, then rejecting said watcher's request to obtain said buddy data.

9. The method of claim 1, wherein said step of authorizing, at least in part by said server, said request for buddy information further comprises:
    automatically authorizing a watcher who is identified in said buddy data to receive public elements of said buddy data.

10. The method of claim 1, wherein said step of authorizing uses a Presence XDMS server to authorize said request for buddy data.

11. The method of claim 1, wherein said step of authorizing uses a Buddy XDMS server, different from a Presence XDMS server, to authorize said request for buddy data.

12. A server administering access to buddy data related to a presentity connected to a communication network that includes the server, the data being accessed by a watcher connected to the communication network, the server comprising:
    a memory device configured to store information associated with a plurality of users associated with said presentity as said buddy data;
    a processor, connected to said memory device, configured to receive a request from said watcher for buddy data of said presentity and to authorize, at least in part, said request for buddy data; and an interface configured to transmit said buddy information to said watcher, wherein said buddy data includes information which identifies another presentity, but which information is not usable to directly contact said another presentity, wherein interface is further configured to receive a request from said watcher to subscribe to presence information associated with said another presentity, and wherein said processor is further configured to forward said request to said another presentity as a message which is relayed from said presentity.

13. The server of claim 12, wherein said watcher is already authorized to receive presence information associated with said presentity when said watcher requests said buddy data.

14. The server of claim 12, wherein said buddy data includes information which identifies another presentity and which information is usable to directly contact said another presentity.

15. The server of claim 14, wherein said interface is further configured to receive a request from said watcher to subscribe to presence information associated with said another presentity, and wherein said processor is further configured to forward said request to said another presentity.

16. The server of claim 12, wherein said memory device is further configured to storing a plurality of data elements for each of said users as said buddy data, wherein at least one of said data elements is indicated as a public data element and at least one of said data elements is indicated as a private data element.

17. The server of claim 16, wherein said processor and said interface are further configured to transmit only data elements in said buddy data which are indicated as public data elements.

18. The server of claim 12, wherein said stored information associated with a plurality of users is one of: a first list of currently subscribed presence users associated with said presentity, a second list of allowed users, and a third list which is different than said first and second lists.

19. The server of claim 12, wherein said processor is further configured to authorize said request for buddy information by determining whether said watcher is part of an allowed user list in a Presence XDMS associated with said presentity, and, if so, sending a request to said presentity which asks said presentity to authorize transmission of said buddy data; and if not, then rejecting said watcher's request to obtain said buddy data.

20. The server of claim 12, wherein said processor is further configured to authorize said request for buddy information by automatically authorizing a watcher who is identified in said buddy data to receive public elements of said buddy data.

21. The server of claim 12, further comprising a Presence XDMS server configured to authorize said request for buddy data.

22. The server of claim 12, further comprising a Buddy XDMS server for authorizing requests for buddy data and a Presence XDMS server for authorizing requests for presence information.

* * * * *